Oct. 2, 1923.

M. H. LUTZ, JR 1,469,656

PISTON FOR INTERNAL COMBUSTION ENGINES

Filed May 23, 1922

Inventor
Martin H. Lutz Jr.,

By
Attorney

Patented Oct. 2, 1923.

1,469,656

UNITED STATES PATENT OFFICE.

MARTIN H. LUTZ, JR., OF NELSONVILLE, OHIO.

PISTON FOR INTERNAL-COMBUSTION ENGINES.

Application filed May 23, 1922. Serial No. 563,055.

*To all whom it may concern:*

Be it known that I, MARTIN H. LUTZ, Jr., a citizen of the United States of America, residing at Nelsonville, in the county of Athens and State of Ohio, have invented new and useful Improvements in Pistons for Internal-Combustion Engines, of which the following is a specification.

The object of the invention is to provide a piston and oil ring construction for internal combustion engines whereby the pumping or feeding by capillary action or suction of oil from the lower or crank case end of the cylinder to the combustion chamber may be prevented without interfering with the supply of a sufficient amount of lubrication to prevent over heating, to the end that the tendency to carbonization in the combustion chamber may be minimized without detracting from the efficiency of the structure; and with this object in view the invention consists in a construction and combination of parts of which a preferred embodiment is shown in the accompanying drawings, wherein:—

Figure 1:
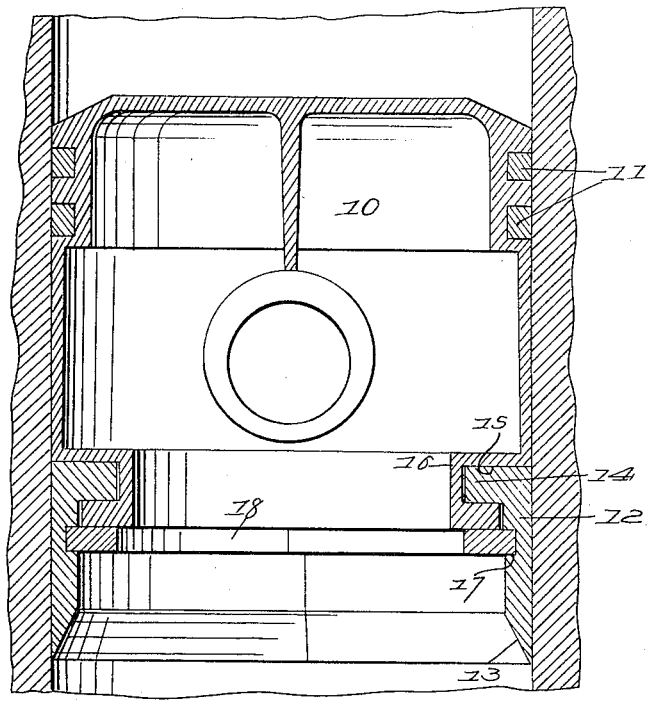
Figure 1 is a sectional view of a piston and cylinder of an internal combustion engine wherein the piston is constructed and equipped in accordance with the invention.
Figure 2:
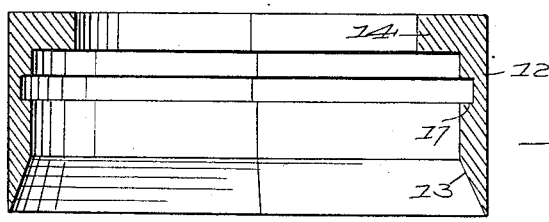
Figure 2 is a detail sectional view of the oil ring which is carried by and constitutes an essential feature of the improved construction.
Figures 3, 4:
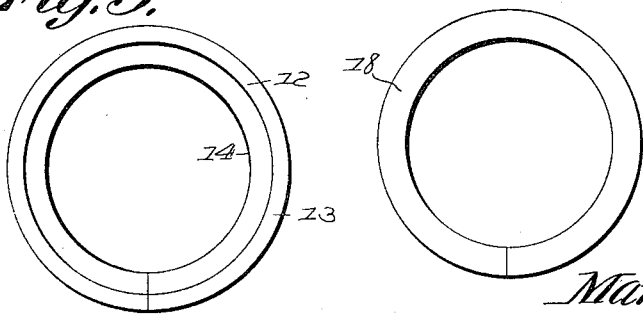
Figures 3 and 4 are plan views respectively of the oil and holding rings.

The piston 10 which in dimensions and general features of construction may correspond essentially with conventional forms now in common use to the extent particularly that it may be provided with any suitable oil ring structure as indicated at 11 near the inner or combustion chamber end thereof, carries an oil ring 12 of the split ring type having an interlocking engagement with the body of the piston and capable of expansion independently thereof. As illustrated this oil ring is provided with an inner beveled oil scraping edge 13 tending during the inward strokes of the piston to scrape and deflect the major portion of the film of oil from the surface of the cylinder wall and thereby prevent the working of any considerable portion of the oil between the outer surface of the ring and the cylinder wall, and the outer end of said ring is provided with an inwardly directed bead 14 fitted in an annular seat 15 formed in a reduced neck portion 16 of the piston so as to secure a break joint relation between the piston and the oil ring. In addition the inner surface of the oil ring is grooved as indicated at 17 to form a seat for an expansion or split holding ring 18 which is disposed in contact with the inner end of the neck portion of the piston to afford a further break joint relation between the piston and the oil ring and at the same time effectively anchor the latter to the piston so as to provide against any lost motion.

In operation it will be obvious the combined expansive action of the oil and holding rings will maintain a snug wear compensating relation between the exterior surface of the oil ring and the wall of the cylinder while the surplus of oil which accumulates on the latter below the plane of the piston will be diverted and displaced during each inward stroke of the piston to minimize the tendency of the creeping of the oil toward the combustion chamber while permitting of a sufficient lubrication of the surface of the cylinder wall, and the break-joint relations between the holding and oil rings and also between the oil ring and the neck of the piston will prevent the passage of oil around the oil ring or through the interior thereof as a path of approach to the portion of the piston above the plane of the oil ring.

Having described the invention, what is claimed as new and useful is:—

1. The combination with a piston of an expansion oil ring carried by and projecting beyond the inner end of the piston with its peripheral surface in contact with the wall of the cylinder, and an expansion holding ring frictionally seated within the oil ring in contact with the inner end of the piston.

2. A piston for internal combustion engines having an inner reduced neck provided with a peripheral channel, an oil ring carried by and extending beyond the inner end of the piston and provided at its outer edge with an inwardly directed bead seated in said peripheral channel of the neck, the oil ring having an internal channel, and a holding ring peripherally seated in the channel of said oil ring in contact with the inner end of the neck portion of the piston.

In testimony whereof he affixes his signature.

MARTIN H. LUTZ, JR.